INVENTOR.
James E. Thompson
BY
Mueller, Aichele, & Rauner
Atty's

United States Patent Office

3,522,482
Patented Aug. 4, 1970

3,522,482
TEMPERATURE COMPENSATED
VOLTAGE REGULATION
James Elbert Thompson, Scottsdale, Ariz., assignor to
Motorola, Inc., Franklin Park, Ill., a corporation of
Illinois
Filed Dec. 26, 1967, Ser. No. 693,485
Int. Cl. H02h 3/28; H02p 9/30
U.S. Cl. 317—31                                      8 Claims

ABSTRACT OF THE DISCLOSURE

An on-off type voltage regulator wherein a sensed voltage to be regulated is level shifted through a temperature responsive variable voltage to a control circuit. The control circuit compares the shifted voltaged from the temperature variable voltage shifter with a reference signal. Depending upon the comparison results, an output amplifier is switched between current conduction and non-conduction. Positive feedback causes the on-off switching action. Two over-voltage protection circuits protect the output amplifier and the sensing current source.

BACKGROUND OF THE INVENTION

This invention relates to control of voltage generation and, particularly, to control of that voltage generation provided by a motor driven alternator.

It has been desired for several years to provide a completely solid-state control circuit for a vehicular motor driven alternator. Problems involved in a provision of a solid-state control circuit include the power dissipation capacity of the controlling element and the stability of the control circuit as well as the susceptibility of the circuit to over-voltage conditions. Electronic or solid-state devices are much faster than any alternator response and, therefore, the control circuit design has to accommodate the differences in responsiveness. It is also desired that the control circuit be in integrated form. To this end, the number of components should be minimized and the semiconductor elements be of the same conductivity type, i.e., built on a P-doped substrate or on an N-doped substrate. Capacitors should be avoided wherever possible. In some voltage regulator systems, such as those used in automotive electrical systems, the generated voltage should vary in accordance with temperature changes.

SUMMARY OF THE INVENTION

It is an object of this invention to provide an improved control circuit for a vehicular alternator which facilitates integration of the control circuit.

It is another object of this invention to provide a semiconductor type alternator control circuit having a fast action temperature response to provide charging of a battery in accordance with temperature variations.

It is a further object of this invention to provide a control circuit for a vehicle alternator which has over-voltage protection in both the control element and in the sensing circuit.

It is another object of this invention to provide a control circuit for a vehicular alternator which has good stability, fast response, and low power dissipation.

A feature of the present invention is the provision of the temperature responsive variable voltage means in series with the sensing circuit. The temperature responsive variable voltage has a unique clamping system which preserves the temperature responsiveness of a transistor element within the circuit. Simple transient suppression is provided.

Another feature is over-voltage protection for both the sensing circuits and the alternator drive amplifier.

A further feature is the temperature compression of a feedback signal from the output amplifier to a signal level shifter for maintaining a temperature compensated voltage hysteresis in the alternator system.

Apparatus incorporating the teachings of this invention feature a temperature responsive circuit in series with the sensing circuit which includes a semiconductor element controlled in accordance with temperature variation with diode clamps for limiting upper and lower voltage variations thereof. Such voltage opposes current flow through the temperature responsive circuit and thereby serves to vary the current flow in response to temperature variations. One diode prevents the transistor device from reaching collector current saturation.

A constant magnitude reference current signal is supplied through a constant impedance and a temperature responsive variable voltage means. This arrangement provides a reference voltage drop from the sense signal line to the input of a high-gain amplifier. When the sense or input voltage amplitude decreases or increases, the change is reflected to high-gain amplifier. The change in amplitude is transferred through the high-gain amplifier thence through a positive feedback path to the reference current source. The arrangement is such that the feedback signal accentuates the change in sensed voltage for causing the high-gain amplifier output to quickly change conductive states, i.e., to or from current conduction.

THE DRAWING

DESCRIPTION OF THE ILLUSTRATIVE EMBODIMENT

Figure 1:
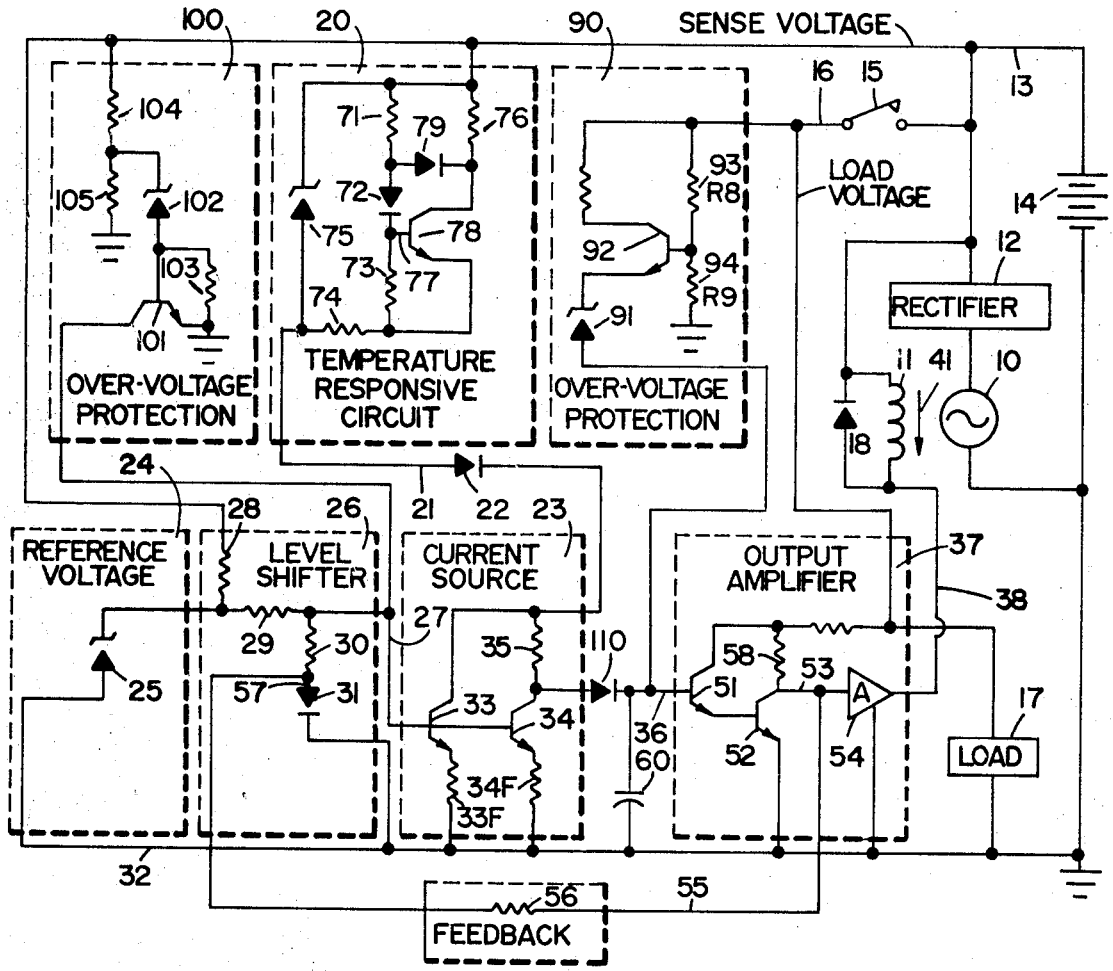
FIG. 1 is a schematic diagram illustrating an embodiment of the present invenion.

Referring first to FIG. 1, the invention is illustrated as being utilized in an automotive electrical system wherein the circuit controls the output voltage of alternator 10 by controlling the voltage across field coil 11. Alternator 10 supplies AC voltage to rectifier 12 which in turn supplies a DC voltage over sense voltage line 13 to charge vehicular battery 14. Ignition or load voltage switch 15 selectively connects line 13 to line 16 for energizing load 17. Load 17 may be the usual load associated with an automobile. The illustrated control circuit senses the voltage amplitude on line 13 and selectively provides a field current through field coil 11 to control the voltage generated by alternator 10. Since the control circuit is of the on-off type, i.e., current is either flowing over line 38 or is blocked, flywheel diode 18 is connected across field coil 11 for limiting voltages thereacross and sustaining current flow therethrough when the control circuit is off, as will be more fully described.

The control circuit receives a sense voltage from line 13 through temperature response variable voltage circuit or means 20 which varies with temperature the sense signal supplied over line 21 through temperature compensating diode 22 to comparison or sense amplifier (devices 51, 52). The sense signal on line 21 also serves as the supply voltage for circuit 23 which serves as a current source. A flat TC (temperature compensated) reference voltage indicating the current magnitude to be established in transistors 33 and 34 is supplied by reference voltage generator 24, which includes Zener diode 25. As utilized in the illustrative embodiment, a resistive-diode level shifter 26 connects reference voltage circuit 24 to reference voltage line 27 which is a control input connection to current source 23. Level shifter 26 operates to set the current level through current source 23 as determined by the Zener diode 25 constant voltage. Resistor 28 passes current to Zener diode 25 and resistors 29 and 30. The fixed potential across Zener diode 25 causes a constant current flow through resistors 29 and 30. A constant voltage is therefore supplied over line 27 to the base electrodes of transistors 33 and 34. Since the forward voltage drop from base to emitter of these transistors is compensated for by diode 31, the voltage drop across resistors 33F and 34F is constant to establish a constant current level through transistors 33 and 34 and resistor 35. This established current level serves to determine the magnitude of the alternator 10 generated voltage, As will be described, a portion of the control signal (later described) for alternator 10 is applied to feedback point 57 to dynamically alter the voltage on line 27 for effecting on-off type regulator action. Feedback is applied to diode 31 to provide temperature compensation for the switching action of the control current, as will be later discussed.

Current source 23 includes semiconductor transistors 33 and 34 connected as shown. At all times, resistor 35 has a constant voltage drop thereacross except for variations due to later explained hysteresis feedback. It is remembered that Zener diode 25 supplies a constant voltage magnitude; therefore, a constant current and constant voltage is supplied across resistors 29, 30, and diode 31 to provide a constant voltage on line 27. Transistor 33, having its collector electrode connected between resistor 35 and isolation diode 22, serves to divert current from resistor 35 such that a relatively large current may be established through temperature control circuit 20, yet resistor 35 may have a relatively large impedance. It is desired to keep resistor 35 at a relatively large impedance to provide a long time constant in the circuit, as will be later referred to. Transistor 34 has a base electrode connected to the base electrode of transistor 33, both of which are connected to the constant voltage on line 27 to provide a constant current through resistor 35.

Transistor 34 supplies a current through resistor 35 setting the input to control output amplifier 37 as the difference between sense voltage and constant voltage drop plus the temperature compensation voltage drop. Output amplifier 37 is preferably a high-gain amplifier which is capable of rapidly switching between current conductive and current nonconductive states. The output amplifier digital signal is supplied over line 38 to field coil 11. Line 38 is either conducting field coil 11 current to amplifier 37 from battery 14 or no current. Upon conduction of amplifier 37, the initial current magnitude over line 38 is the below described circulating coil current.

Before proceeding further with the circuit description, the operation of alternator 10 with the on-off control current of line 38 is explained. The illustrated control circuit is adjusted such that the voltage on line 13 may oscillate between the lower amplitude 39 (FIG. 3) and upper amplitude 40. For example, in a 12-volt vehicular system the voltage differential between lines 39 and 40 may be 0.1 volt. When amplifier 37 permits full current to flow on line 38, diode 18 is reverse biased and all current flows through coil 11 in the direction of arrow 41. During this time, the voltage generated by alternator 10 is increasing as indicated by line 42 in FIG. 3. When amplitude 40 is reached, amplifier 37 is turned off and no current is permitted to flow over line 38. Flywheel diode 18 then completes a circular circuit with coil 11 such that as the electric field of coil 11 begins to collapse, a circulatory current flows in the direction of arrow 41, thence through diode 18, maintaining voltage generation in alternator 10. As the field collapses, the voltage generated by alternator 10 and, therefore, the voltage supplied by rectifier 12 to line 13, is decreasing, as indicated by lines 45 in FIG. 3. The voltage supplied on line 13 has an effective DC potential indicated by line 46 (FIG. 6) with a ripple thereon having a magnitude equal to the difference between lines 39 and 40.

Amplifier 37 can be divided into two portions. A high-gain input portion 50 having transistors 51 and 52 connected as shown supplies a control singal over line 53 to high-power output amplifier portion 54. Amplifier portion 54 may be on a single chip and may be of the Darlington input-connected type of amplifier having two active semiconductor elements therein. The control signal on line 53 is supplied over line 55 through feedback resistor 56 to feedback input connection 57 of level shifter 26 which serves to bias current source 23. During voltage generation, when the sense voltage amplitude on line 13 and, therefore, the input signal on line 21 has a magnitude decreasing below amplitude 39 of FIG. 3, the voltage drop is reflected across resistor 35 to line 36, it being remembered that resistor 35 has a constant current flowing therethrough. Such decreasing voltage amplitude decreases the electrical conductivity of transistors 51 and 52 and thereby increases the voltage on line 53. The increased voltage is supplied over feedback line 55 through feedback resistor 56, thence to feedback connection 57 of level shifter 26 and thence to reference line 27 to adjust the bias current source 23 and thereby adjust its operation as below described. The increased sense voltage is transferred to line 27 as a dynamic reference signal of increasing magnitude. This action increases the conductivity of transistors 33 and 34, further reducing the signal magnitude on line 36, quickly switching input portion 50 to current nonconduction and output portion 54 of amplifier 37 to current saturation. The dynamic relation of the sense voltage to the reference signal is that of a rapidly decreasing sense voltage, assuming the reference signal on line 27 as a base for comparison. Current then flows over line 38 to increase the voltage generated by alternator 10.

Figure 3:
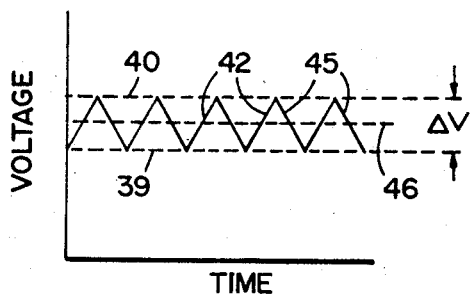
FIG. 3 is a graph illustrating rectified voltage supplied by a generator controlled by the FIG. 1 circuit.

In a similar manner, when the voltage amplitude on line 13 is higher than amplitude 40 of FIG. 3, the voltage on line 36 is increased at an accentuated pace causing transistors 51 and 52 to quickly become highly conductive. As a result, the voltage drop across resistor 58 has increased, thereby rapidly lowering the voltage magnitude on line 53. Such lowered or decreasing voltage magnitude is reflected to feedback connection 57 and thence to reference line 27 which decreases the conductivity of transistor 34, thereby cumulatively increasing the voltage magnitude of line 36. As a result, amplifier 54 quickly switches to current nonconduction blocking current flow on line 38.

Capacitor 60 is connected between control signal line 36 and ground reference potential line 32 to provide two functions. A first function is to filter out the ripple inherent in three-phase alternator generated power. In this function, the RC time constant provided by relatively large resistor 35 and capacitor 60 provides an RC filter sufficient to prevent such variations from affecting output amplifier 37. A second function provided by capacitor 60 is to control the switching time of the control circuit positive feedback loop such that the switching is slow enough not to generate radio frequency interfering signals. Such feedback loop includes amplifier 37, feedback resistor 56, level shifter or bias source 26, and current source 23. Therefore, capacitor 60 is a switching rate control.

Figure 2:
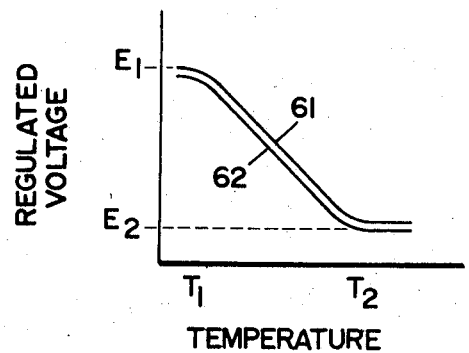
FIG. 2 is a graph illustrating a temperature voltage characteristic of the FIG. 1 illustrated circuit.

Referring next to FIG. 2, the temperature responsiveness of the control circuit is described. In charging battery 14, it is known that at lower temperatures the charging voltage amplitude should be greater than at higher temperatures to effect a proper charge rate for extending battery life. The desired variation in voltage for a constant charge rate is indicated by lines 61 and 62 in FIG. 2. The spacing between lines 61 and 62 represents the voltage hysteresis provided by the control circuit positive feedback switching loop, i.e., the voltage differential, $\Delta V$, between magnitude 39 and 40 in FIG. 3, $\Delta V$ held constant over the entire temperature range between $T_1$ and $T_2$ as indicated by parallel lines 61 and 62. Clamping is provided in temperature responsive circuit 20 to flatten the curves at the extremities. The voltage hysteresis is made constant by making the variation with temperature of forward voltage drop across diode 31 identical with the $V_{be}$ of the transistors (not shown) in output portion 54 of amplifier 37.

The temperature responsive variable voltage circuit 20 causes the variation of generated voltage on line 13 as illustrated in FIG. 2 by varying the electrical voltage between lines 13 and 21 and thereby varying the voltage drop therethrough to vary the indication of the line 13 voltage to amplifier 37. As the dynamic voltage across temperature responsive circuit 20 is increased, the resultant current flow will be decreased, thereby effectively indicating that the voltage magnitude on line 13 has decreased. This action causes the control loop, including current source 23, to effect generation of a higher amplitude voltage on line 13. In a similar manner, a decreased voltage drop between lines 13 and 21 makes it appear to current source 23 that sense voltage magnitude on line 13 has increased thereby causing the control circuit to effect a lower amplitude voltage generation in alternator 10. Clamping action is provided in temperature responsive circuit 20 to provide the flat portions at the outer temperature extremes of curve 61, 62 of FIG. 2. Since the voltage hysteresis of the control loop is constant with temperature, the frequency of oscillation between amplitudes 39 and 40 of FIG. 3 is maintained relatively constant throughout the temperature range between $T_1$ and $T_2$.

In temperature responsive circuit 20, transistor 70 provides voltage variation by the temperature responsiveness of its base-to-emitter junction (not shown). It is well known that such temperature voltage characteristic is negative with respect to changes in temperature, that is, as temperature increases the forward voltage drop across base-to-emitter junction decreases. The rate of change of a typical base-to-emitter junction is about −2 millivolts per degree centigrade temperature change. The temperature responsive circuit 20 can be analyzed as having two parallel current paths between lines 13 and 21: one path comprising transistor 78 with current limiting resistor 76, and a second path comprising the voltage divider consisting of resistors 71 and 73 and diode 72. In the following analysis resistor 71 has a resistance value $R_1$, and resistor 73 will have a resistance value of $R_2$. First, it should be noted that the base-to-emitter junction of transistor 78 is in parallel circuit relationship to resistor 73, and the voltage drops are selected such that the base-to-emitter voltage regulates or controls the voltage across resistor 73 in accordance with the temperature responsive voltage drop associated with the forward biased base-to-emitter junction. The forward voltage drop across resistor 73 is always caused by the current flowing from line 13 to line 21. Assume the forward base-to-emitter voltage drop of transistor 78 has an amplitude $\phi$. $\phi$ is a temperature responsive voltage generated across resistor 73.

For purposes of analysis, assume that an electrical current having an amplitude I flows from line 13 to line 21 through circuit 20, the temperature responsive voltage generated as a result of such current flow is equal to $$\phi \left( \frac{R_1 + R_2}{R_2} + 2 \right)$$

Since the temperature control circuit is not perfect, it has a certain dynamic impedance. The dynamic impedance of temperature responsive circuit 20 is $R_1/B$ wherein B is the base-to-collector current gain of transistor 78. The temperature responsive voltage opposes current flow and therefore appears as a variable impedance to any current flowing from line 13 to line 21.

The current flowing from line 13 to line 21 is equal in magnitude to the sum of the current flowing through the transistor 78 and through resistor 71 and diode 72 and resistor 73. Since the emitter-to-base junction of transistor 78 determines the voltage drop across resistor 73, and, therefore, the current flow therethrough, the current flow through resistor 73 need not be separately considered. The transistor 78 base current, $i_b$, flows on line 77 from diode 72 and controls the current conductivity of transistor 78 between its collector and emitter electrodes. Therefore, the current flowing from the collector electrode to the emitter electrode of transistor 78 (also the current through resistor 76) is equal to $Bi_b$. The current through resistor 71 has two components. The first component also flows through resistor 73 and has an amplitude $\phi/R_2$, it being remembered that the voltage across resistor 73 is determined by the voltage drop of the base-to-emitter junction of transistor 78. The second current component is the base current $i_b$ flowing over line 77. Therefore, the total current I can be represented as:

$$I = Bi_b + i_b + \phi R_2 \qquad (1)$$

The potential difference V between lines 13 and 21 is equal to the current I times the impedance of circuit 20:

$$V = (\phi/R_2 + i_b)R_1 + \phi \qquad (2)$$

Equation 2 represents the instantaneous voltage drop between lines 13 and 21 with the left-hand term representing the voltage drop across resistor 71 and diode 72, while $\phi$ is the voltage drop across resistor 73.

Solving Equation 1 for the base current $i_b$:

$$i_b = (I - \phi/R_2)/(B+1) \qquad (3)$$

Factoring Equation 2:

$$V = \phi(R_1/R_2) + R_1 i_b + \phi \qquad (4)$$

Substituting Equation 3 into Equation 4 and rearranging $$V = \phi(R_1/R_2) + \phi + R_1(I - \phi/R_2)/(B+1) \qquad (5)$$

Factoring:

$$V = \phi(R_1/R_2) + \phi + (IR_1)/(B+1) \\ -R_1(\phi/R_2)/(B+1) \qquad (6)$$

Factoring out the term $\phi$:

$$V = \phi\{(R_1/R_2 + 1 - R_1/[(R_2)(B+1)]\} \\ + IR_1/(B+1) \qquad (7)$$

In Equation 7 the term on the left hand multiplied by $\phi$ is the temperature responsive generator portion, while the right-hand term is the voltage drop due to the current, I, flowing through the incremental impedance, $R_1/(B+1)$, the temperature responsive voltage generator 20. In practice, the term "$-R_1/(R_2)(B+1)$" is negligible; the Equation 7 may be simplified to:

$$V = \phi(R_1/R_2 + 1) + IR_1/(B+1) \qquad (8)$$

As the temperature decreases, the voltage between lines 13 and 21 is increased by the above-described circuit until the Zener diode 75 breakdown voltage is reached, whereupon it commences to conduct current, and limits the voltage between lines 13 and 21 to value $E_Z$. This action is the first and low temperature clamp.

At increasing temperatures, the electrical voltage drop circuit 20 continues to decrease. Transistor 78 becomes more and more conductive, diverting more and more of the total current I through current limiting resistor 76 until the voltage drop across resistor 76 is sufficiently large to lower the voltage magnitude on collector 78 until diode 79 is forward biased into current conduction. At the onset of current conduction by diode 79, the collector 78 voltage is clamped to voltage $E_2$ such that further increases in temperature will not further decrease the generative voltage. The combination of diode $D_2$ with diodes 72 and 79 and transistor 78 forms a nonsaturating clamp such that transistor 78 never collector current saturates. As such, its current amplifying action is always maintained. This action is desirable to maintain control of the voltage generated at the high temperature end. In the event that the transistor 78 is saturated, the current gain characteristic drops causing increasing current to flow over line 77. Such action has a degrading effect on the temperature-voltage slope, and, in fact, causes the voltage to again increase beyond temperature $T_2$. Therefore, it is important that transistor 78 be kept in a nonsaturating operating condition, as by diode 79. Diode 72 serves to compensate temperature variation of the clamp voltage provided by diode 79.

Referring again to current source 23, two transistors 33 and 34 are used to permit the resistance value of resistor 35 to be large and yet provide a relatively large current to flow through temperature responsive circuit 20. For example, 2.5 milliamperes are desired to operate a typical temperature responsive circuit 20. It is desired to have 0.5 milliampere current flowing through resistor 35. Transistor 33 serves to divert a portion of the temperature control current amplitude from resistor 35. Transistor 33 and 34, insofar as control circuit is concerned, are connected in a parallel circuit relationship.

In automotive applications, it is desired that the ignition terminal, such as may be represented by line 16, be connected directly to the output terminal of rectifier 12. One end of field coil 11 is also connected to the output terminal of rectifier 12, i.e., line 13. As a result of these connections, transient electrical signals may appear on line 13. Further, if battery 14 were to be disconnected while the motor was operating, i.e., alternator 10 was generating electricity, then transients in the order of 80 to 100 volts may be introduced on line 13. Such a high voltage transient can destroy the semiconductor devices in the temperature responsive circuit 20 and in output amplifier 37.

To prevent overvoltage damage to amplifier 37, overvoltage protection circuit 90 is connected between line 16 and line 37 and is responsive to an overvoltage on line 16 to rapidly turn or switch output amplifier 37 to an "off" condition for reducing the generated voltage amplitude. Overvoltage protection circuit 90 includes overvoltage reference Zener diode 91. The Zener diode 91 voltage is multiplied by the $$\frac{R_8+R_9}{R_9}(V_z+\phi)$$

resistor ratio ($R_8$ is the impedance of resistor 93 while $R_9$ is the impedance of resistor 94) to determine the maximum voltage permitted on line 16 where $V_z$ is the Zener diode 91 reverse breakover voltage. When the voltage on line 16 increases, transistor 92 is made current conductive and supplies current through Zener diode 91 to line 36. Such current causes the first stage 51 and second stage 52 of amplitude 37 to reach collector current saturation, making the voltage magnitude on line 53 small, causing amplifier 54 to turn off the generation of voltage by alternator 10. When transistors 51 and 52 are in a collector current saturation condition, amplifier 54 is off and is better able to absorb high voltage transients from line 16 than if they were in another current conductive state. Transistors 51 and 52, being saturated, do not see the transient. Alternately, Zener diode 91 may be connected to the base electrode of transistor 52 to provide such overvoltage protection of amplifier 37. Transistor 92 may be eliminated whenever its gain characteristics are not needed in circuit 90; that is, the cathode of Zener diode 91 is connected directly to the junction of resistors 93 and 94.

An overvoltage condition on line 13 also can cause Zener diode 75 of temperature responsive circuit 20 to conduct current. Such overvoltage would then be imposed through diode 22 on transistor 33 with no current limiting impedance therebetween. For example, if the overvoltage on line 13 was 100 volts and transistor 33 could tolerate a voltage of 45 on its collector, then it would be destroyed by the overvoltage condition. The overvoltage protection of transistor 33 is provided by second overvoltage protection circuit 100. Circuit 100 causes transistor 33 to become current nonconductive prior to occurrence of an overvoltage condition.

Second overvoltage protection circuit 100 includes transistor 101, Zener diode 102, and transistor base resistor 103. Resistor 103 controls the leakage current of transistor 101. A voltage divider includes resistors 104 and 105 to determine the overvoltage magnitude on line 13 causing Zener diode 102 to conduct and thereby make transistor 101 in a collector current saturation state which effectively grounds line 27. For example, if a transient of over 30 volts occurs on line 13, transistor 101 and the Zener diode 102 become current conductive. The base voltage of transistor 33 is then made low with respect to the emitter electrode voltage making transistor 33 at a current nonconductive state. Transistor 33 is constructed to withstand overvoltages in a current nonconductive state as may be imposed thereon through Zener diode 75.

In using the FIG. 1 illustrated embodiment with an automotive alternator operated at low speeds, and with load 17 and battery 14 disconnected, repetitive transients were observed in the control circuit. It is believed these transients were caused by capacitor 60 periodically discharging through transistor 34 to generate a control signal on line 36 calling for a substantial increase in generated voltage. When so increased, capacitor 60 is recharged causing amplifier 37 to reestablish the desired operating conditions. To block the above-described discharge path, semiconductor diode 110 was inserted between line 36 and transistor 34 and poled to conduct current from resistor 35 to capacitor 60. The control circuit operated successfully with diode 110. The small amplitude base current drawn by transistor 51 and therefore a small amplitude current through diode 110 permits diode 110 to be a small signal-type diode with low forward impedance.

I claim:
1. An on-off type voltage regulator circuit responsive to an input signal at an input means to supply first and second digital control signals, respectively, when the input signal has a magnitude above and below a reference signal magnitude, the improvement including in combination,
   a temperature responsive means receiving the input signal and having an output terminal, with a current flow therethrough in a first direction between said terminal and the input means being varied in accordance with temperature variation,
   reference signal means supplying a reference signal magnitude,
   signal level shifting means receiving said reference signal and having a feedback connection and responsive to a signal on said feedback connection to alter said reference signal magnitude in accordance therewith and supplying a dynamic reference signal,
   a semiconductor type current source having a control input means, a signal input means, and output means, said control input means receiving said dynamic reference signal and said signal input means electrically connected to said temperature responsive means output terminal for receiving the input signal,
   a capacitor connected to said output means,
   an output amplifier having signal responsive switching means with an input portion connected to said output means and an output portion having current conducting and nonconducting output states,
   clamping means in said temperature responsive means for limiting the maximum and minimum current magnitudes supplied to said output terminal,
   and said output amplifier supplying a positive feedback signal to said feedback connection such that as said output amplifier tends to switch to supply said first and second digital signals said dynamic reference signal indicates that said input signal magnitude is greater or less than the actual magnitude thereof, respectively.

2. The circuit of claim 1 wherein said temperature responsive means includes avalanche Zener semiconductor means connected between said input means and said output terminal and poled to oppose current flow in said first direction between said input means and said output terminal and operative when said temperature responsive means is supplying a desired minimum current amplitude to conduct current in said first direction in a voltage regulating manner to limit the effect of said temperature responsive means on the voltage regulator circuit.

3. The circuit of claim 2 wherein said temperature responsive means comprises,
   first, second, and third resistors series connected in a first series circuit,
   said Zener means connected in parallel to said series circuit,
   a fourth resistor,
   a transistor having a base-to-emitter junction and collector and emitter electrodes connected in a second series circuit with said fourth resistor,
   said second series circuit connected across said first and second resistors,
   a base electrode connected to said second resistor adjacent said first resistor such that said base-to-emitter junction of said transistor provides a temperature responsive voltage across said second resistor,
   a first unilateral current conducting device electrically interposed between said first and second resistors and poled to conduct current between said input means and said output terminal,
   and a second unilateral current conducting device connected between said first resistor adjacent said first device and said collector electrode and poled to conduct current whenever said transistor is conducting a predetermined magnitude of current causing a voltage drop across said fourth resistor greater than the voltage drop across said first resistor whereby the transistor never reaches collector-current saturation.

4. The cicuit of claim 1 further including overvoltage protection circuit means disposed between said input means and said input portion of said output amplifier and responsive to a predetermined overvoltage on said input means to supply a large drive current to said input portion whereby the output amplifier input portion reaches collector current saturation and said output amplifier portion is switched to a current nonconducting output state.

5. The circuit of claim 1 further including an overvoltage sensing circuit disposed between said input means and said sense amplifier input portion and responsive to a predetermined overvoltage to conduct current to force said current source to a current nonconduction state.

6. The system of claim 5 wherein said current source includes first and second transistor devices,
   a sense resistor connected between said first transistor device and said output terminal and said second semiconductor device connected to said output terminal such that current flowing through said temperature responsive means is diverted by said second transistor device for permitting a large impedance in said sense resistor with a large current flowing through said variable impedance means.

7. The circuit of claim 1 wherein said feedback connection is from a point intermediate said output amplifier input portion and output portion to said signal level shifting means,
   a reference potential means connected to said output portion,
   a diode in said signal level shifting means connected from said feedback line to said reference potential means such that it is in parallel circuit with said output portion of said output amplifier, and said diode having identical temperature characteristics as said output portion.

8. The circuit of claim 1 further including amplifying means electrically interposed between said output means and said capacitor.

References Cited
UNITED STATES PATENTS 3,201,681    8/1965    Wilgen et al.
2,966,625   12/1960    Kelley _____ 322—24

J D MILLER, Primary Examiner

H. FENDELMAN, Assistant Examiner

U.S. Cl. X.R.

322—23, 28, 33; 323—19, 22, 38